United States Patent Office 3,500,707
Patented Mar. 17, 1970

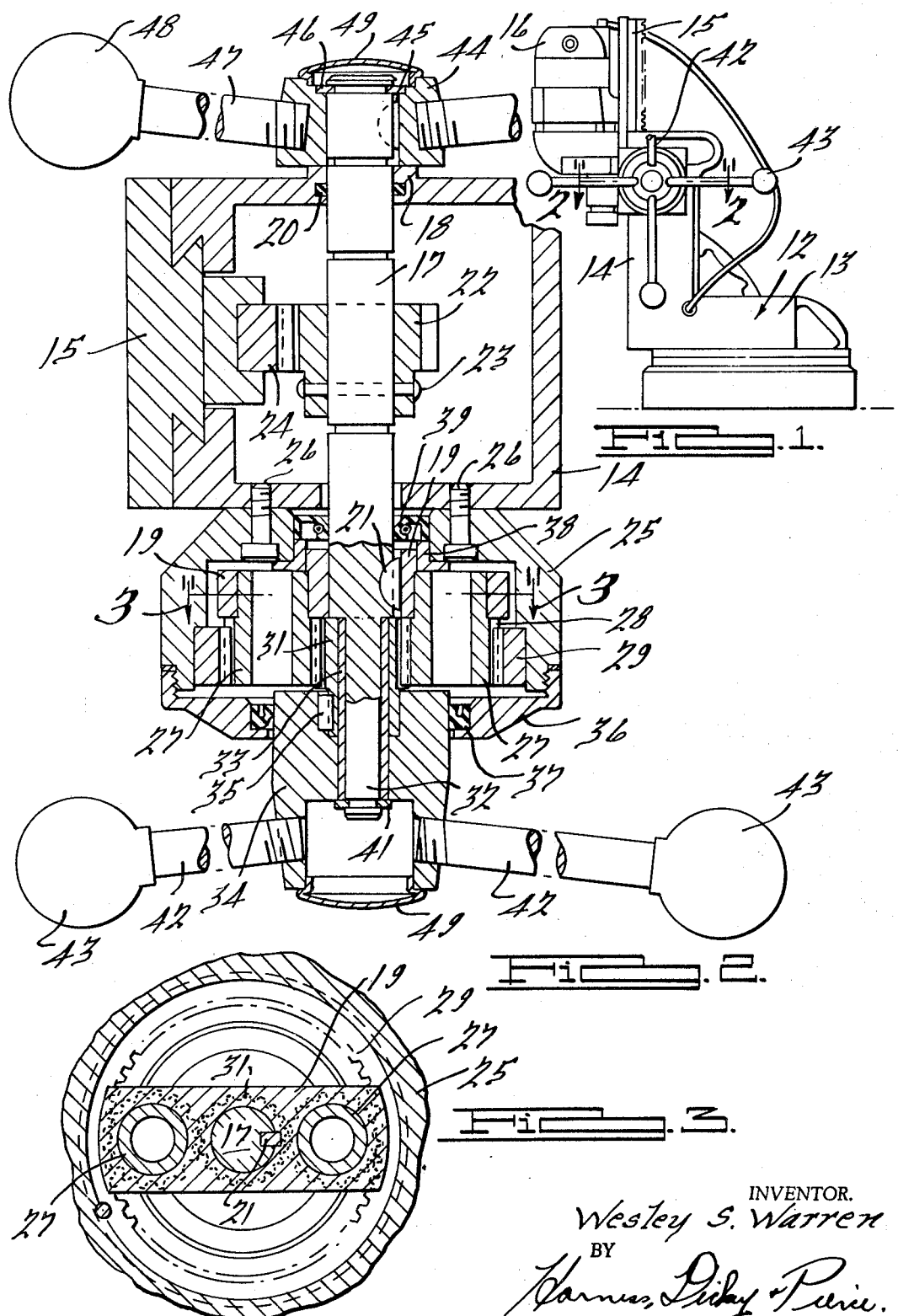

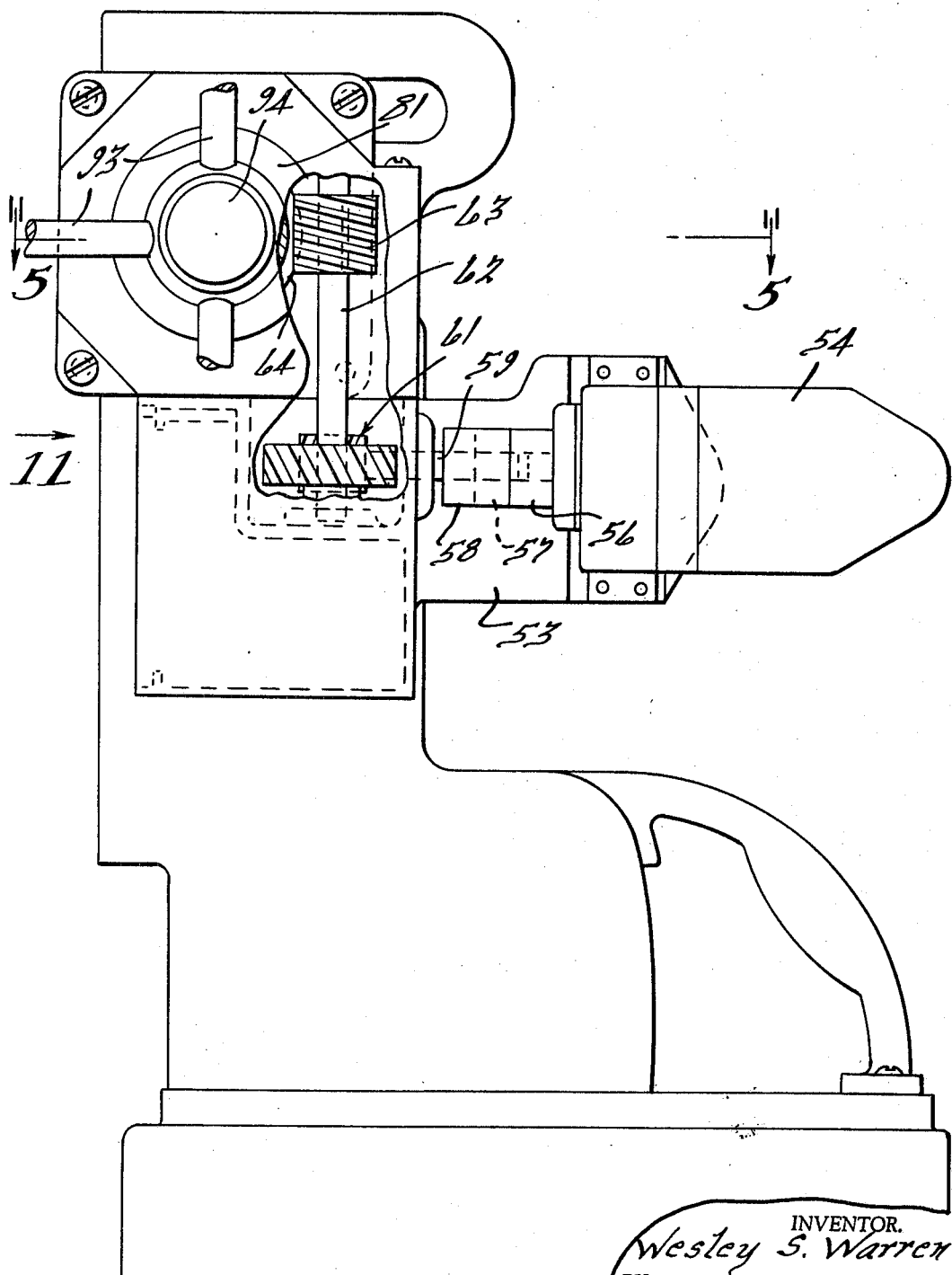

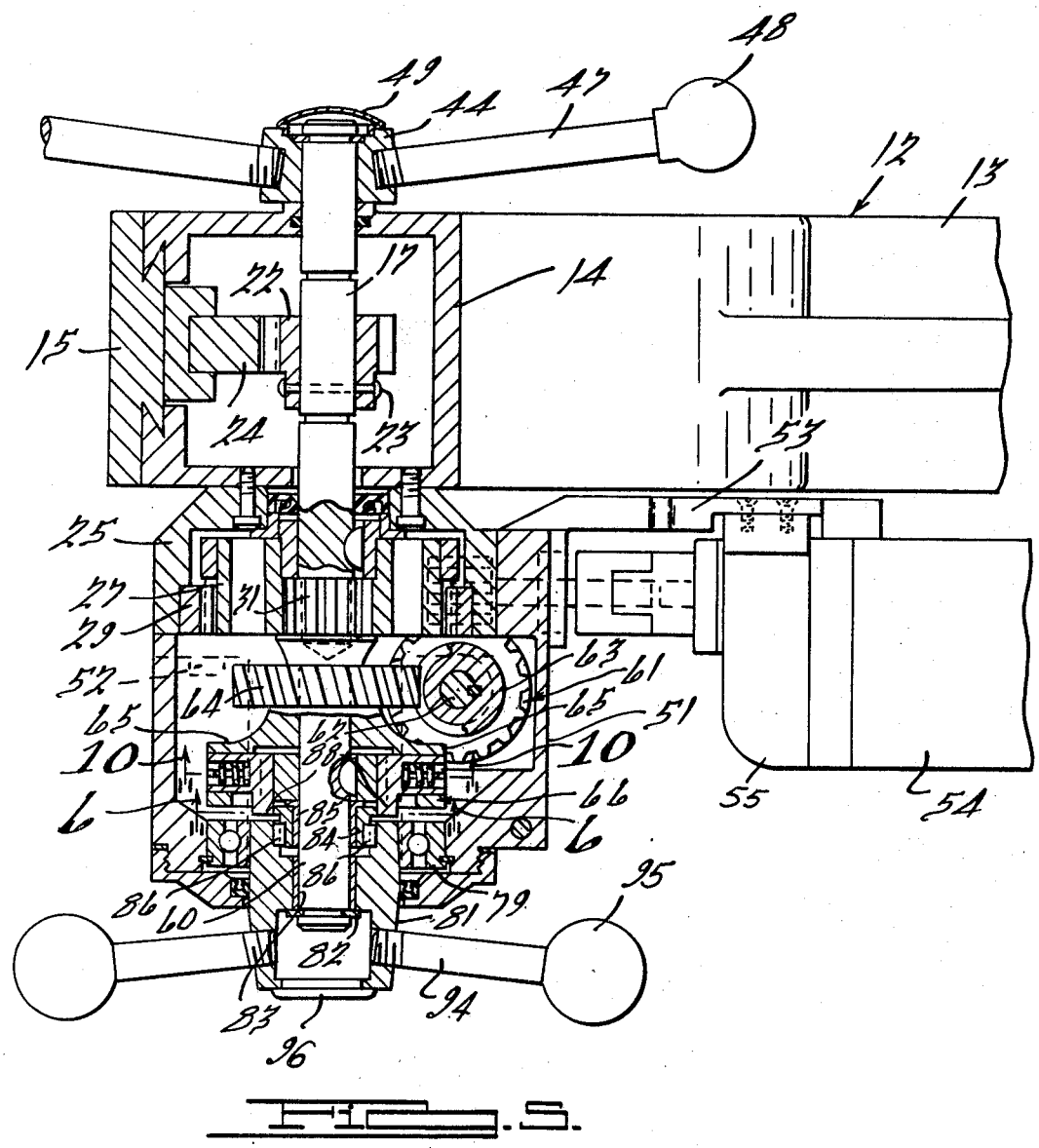

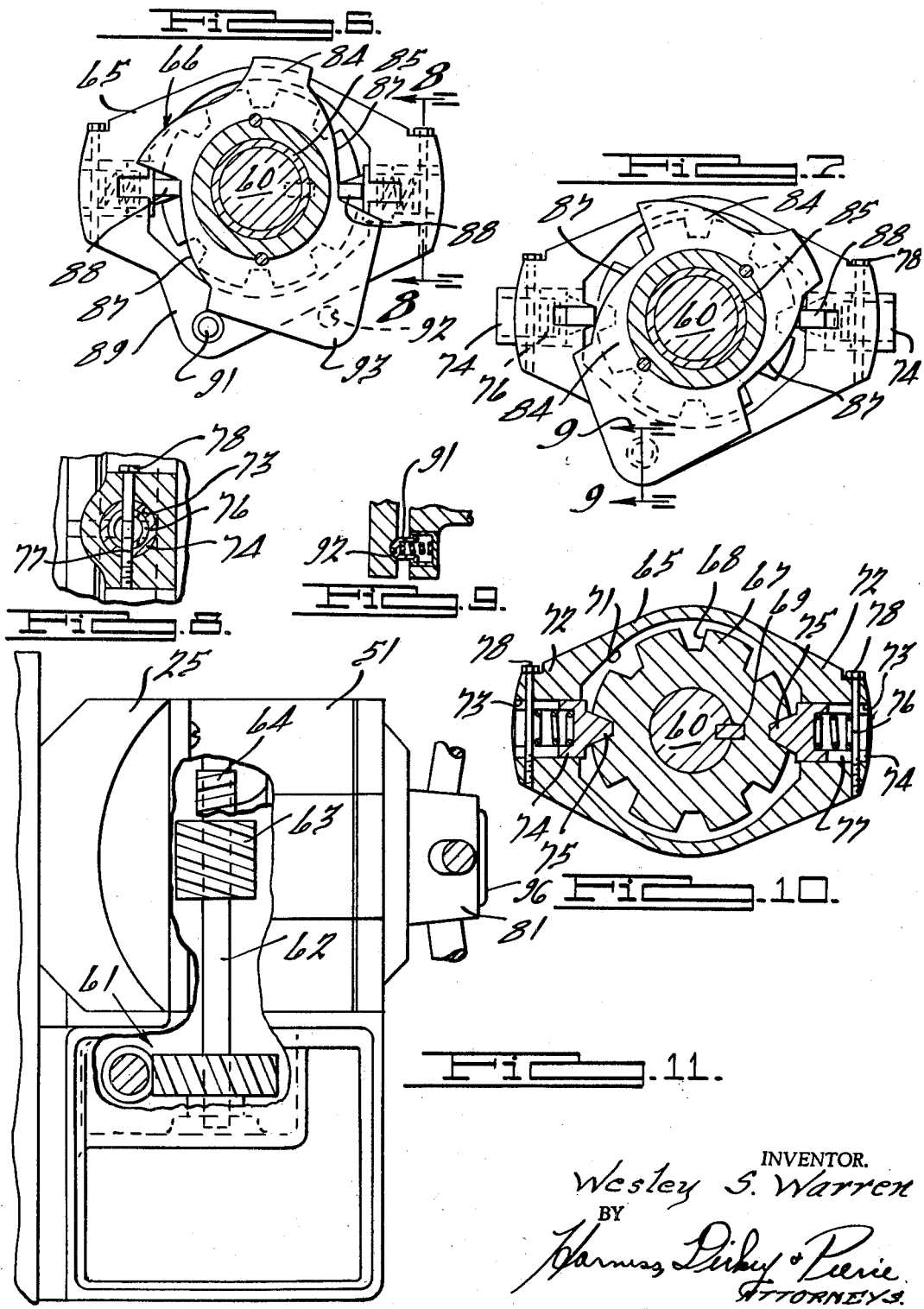

3,500,707
MANUAL AND MOTOR OPERATED PLANETARY FEED FOR DRILL
Wesley S. Warren, Bloomfield Hills, Mich., assignor to General Automation Manufacturing, Incorporated, a corporation of Michigan
Filed June 7, 1967, Ser. No. 644,260
Int. Cl. B23b 39/10
U.S. Cl. 77—33.4
9 Claims

ABSTRACT OF THE DISCLOSURE

The invention pertains to a portable drill device having a magnetic base which secures itself to a steel plate to be drilled. The driven drill is moved by rack and pinion toward and into the workpiece either manually or by a motor. In either arrangement, the drive for advancing the drill is through a planetary gear system which provides a mechanical advantage to the applied force.

BACKGROUND OF THE INVENTION

The drill presses of the planetary magnetic base type have been employed heretofore in the art for manual and motor operation. Such a drill press applied the manual or motor force directly to the shaft having the pinion which operates the rack for applying the drilling pressure. Such a drill press is illustrated in an application for U.S. Letters Patent to Wesley S. Warren et al., Ser. No. 341,363 and now Patent No. 3,371,257 for "Controls for Electromagnetic Base Tool" and assigned to the assignee of the present invention.

SUMMARY OF THE INVENTION

The invention pertains to a casing attached to the upright standard of a drill device which contains a planetary gear system for driving a shaft. The shaft has a pinion thereon with the teeth in mesh with the teeth of a rack attached to a dovetail slide on the standard to which the motor for the drill is secured. A sun gear is fixed to a hub containing a plurality of lever arms which drives the planet gears and carrier from a ring gear within the casing. The sun gear may be driven from a motor through a worm set which will drive the pinion shaft through the planet train. The opposite end of the pinion shaft may have a hub secured thereon with lever arms by which the dovetail slide and motor may be rapidly retracted.

BRIEF DESCRIPTION OF THE DRAWINGS

FIGURE 1 is a side view of a magnetic base drill press embodying features of the present invention;

FIG. 2 is an enlarged broken sectional view of the structure illustrated in FIG. 1, taken on the line 2—2 thereof;

FIG. 3 is a broken sectional view of the structure illustrated in FIG. 2, taken on the line 3—3 thereof;

FIG. 4 is an enlarged view of structure, similar to that illustrated in FIG. 1, with a motor drive thereon;

FIG. 5 is an enlarged sectional view of the structure illustrated in FIG. 4, taken on the line 5—5 thereof;

FIG. 6 is an enlarged sectional view of the structure illustrated in FIG. 5, taken on the line 6—6 thereof with the clutch in engaged position;

FIG. 7 is a view of the structure illustrated in FIG. 6 showing the clutch in disengaged position;

FIG. 8 is a sectional view of the structure illustrated in FIG. 6, taken on the line 8—8 thereof;

FIG. 9 is a broken sectional view of the structure illustrated in FIG. 7, taken on the line 9—9 thereof;

FIG. 10 is a sectional view of the strutcure illustrated in FIG. 5, taken on the line 10—10 thereof, and FIG. 11 is a broken sectional view of the structure illustrated in FIG. 4, as viewed from the point 11 thereof.

DESCRIPTION OF THE PREFERRED EMBODIMENTS

Referring to FIGS. 1, 2 and 3, the magnetic base drill device embodies an L-shaped casting 12 having a base section 13 and an upright standard section 14. A dovetail slide 15 carries a motor 16 for vertical movement on the face of the standard section 14. The base section 13 has a coil which is energized from an electric circuit through control elements which are mounted on a removable panel as illustrated, described and claimed in the above mentioned copending application. The standard section 14, as illustrated in FIG. 2, has one end of a shaft 17 secured in a boss 18 and sealed by an O-ring 20. The opposite end of the shaft 17 is secured to a carrier 19 in driving relation therewith by a key 21. The shaft 17 has a pinion 22 secured thereto by a rivet 23, the teeth of the pinion being in mesh with the teeth of a rack 24 secured to the rear of the slide 15. The rotation of the shaft 17 and the pinion 22 raises and lowers the slide 15 and motor 16 in the conventional manner.

The carrier 19 is mounted within a housing 25 which is secured to the side of the standard section 14 by screws 26. The carrier 19 has a pair of planet gears 27 journaled therein with teeth 28 thereon which are in mesh with the teeth of a ring gear 29 and those of a sun gear 31. The shaft 17 has an extension 32 of reduced diameter which carries sleeve bearings 33 on which the sun gear 31 and a hub 34 rotate. The sun gear is secured to the hub by a key 35 to be in driving relation therewith. A cover 36 is threaded on the housing 25 and is sealed to the hub by a sealing element 37. The carrier 19 is journaled on a flanged bearing 38 and the shaft 17 is sealed adjacent to the bearing by a sealing element 39. The hub 34 is retained on one end of the shaft extension 32 by a split spring washer 41 so that the united hub and sun gear 31 can rotate as a unit on the sleeve bearing 33. The hub 34 has a plurality of rods 42, herein illustrated as four in number, threaded thereon and extending outwardly thereof and provided with balls 43 on the ends which are grasped by the hand of the operator for turning the hub 34. The opposite end of the shaft 17 has a hub 44 secured thereon by a key 45 and by a split washer 46 in the conventional manner. A plurality of rods 47 are threaded into the hub 44 at equally spaced points and provided with balls 48 on the ends which may be grasped by the operator to provide a quick return when raising the slide 15 and motor 16. The circular aperture in the ends of both of the hubs 34 and 44 are closed by buttons 49 in the conventional manner.

In operation, when the drilling device is secured on the steel plate to be drilled by the energized magnet, the actuation of the hub 44 by the movement of a rod 47 will produce the rapid movement of the slide 15 and motor 16 along with the drill until the drill contacts the plate. Thereafter, the hub 34 is rotated by a force applied to one of the rods 42 to produce the slow downward advancement of the motor 16 and drill with a substantial pressure during the drilling operation. The pressure applied to the rod 42 is multiplied at least four times through the planet system so that a greater force can be applied to the drill with less effort by the operator. The rotation of hub 34 produces the rotation of the sun gear 31 since it is fixed thereto by the key 35 producing the rotation of the planet gears 27 the teeth of which rolling on the teeth of the ring gear 29 produces the rotation of the carrier 19, the shaft 17 and the pinion 22 to apply downward pressure on the slide 15 through the teeth of the rack 24 during the drilling operation. After the drilling operation, the motor 16 and slide 15 are rapidly raised by the reverse rotation of the hub 44.

Referring to FIGS. 4 to 11, a similar arrangement is disclosed for raising and lowering the slide 15 and motor 16 through the operation of a motor 54. The housing 25, the planet set including carrier 19, the two planet gears 27, the ring gear 29 and the sun gear 31 along with the shaft 17, pinion 22, the rack 24 and slide 15 are the same as that hereinabove described with regard to the structure of FIGS. 1 to 3 inclusive. The one end of the shaft 17 contains the hub 44 and rods 47 by which the slide and motor may be returned to raised position.

A housing 51 is secured by a plurality of screws 52 in extension of the housing 25. The housing 51 has an extending arm 53 which supports the motor 54 having a gear reduction end 55 which drives a shaft having a head 56 with a tongue 57 on the end. The tongue 57 extends into a slot in a head 58 secured on the end of a shaft 59.

The shaft 59 drives a worm gear set 61 to drive a shaft 62 which drives a worm gear 63 and a worm wheel 64 which carries a boss 65. The worm wheel 64 and boss 65 are freely rotatable upon a shaft section 60 in extension of the shaft 17. A clutch mechanism 66 secures and releases the worm wheel 64 and boss 65 to and from the shaft section.

The clutch mechanism 66 embodies a star wheel 67 having V-shaped peripheral notches 68 therein. The wheel is secured to the shaft section 60 by a key 69. The boss 65 has a recess 71 for receiving the star wheel 67. Oppositely extending end portions 72 of the boss has cylindrical apertures 73 which receive the cylindrical bodies of locking lugs 74 having V-shaped projections 75 which extend in oppositely disposed notches 68 on the wheel 67, as illustrated in FIGS. 6 and 10. The bodies of the lugs 74 are hollow and receive a spring 76 and are provided with a diametrical slot 77 through which a screw 78 extends for tensioning the spring and preventing the rotation of the body within the apertures 73.

The end of the housing 51 carries a ball bearing 79 to support a hub 81 which is retained on the shaft section 60 by a split washer 82 for rotation on a sleeve bearing 83 on the shaft section. A cam element 84 is journaled on a sleeve bearing 85 on the shaft section 60 and is fixed to the hub 81 by a pair of dowel pins 86. The cam element 84 has two cam surfaces 87 disposed in position to engage the extending portion 88 of the V-shaped projections 75. As illustrated in FIG. 6, the projections 75 are within the V-shaped notches 68 providing a driving relation between the shaft section 60 and the worm wheel 64.

When the hub 81 is rotated to the position illustrated in FIG. 7, the cam surfaces 87 in engagement with the projections 88 have moved the V-shaped projections 75 outwardly out of engagement with the periphery of the star wheel 67 so as to permit the wheel to rotate with the shaft independently of the worm wheel 64. The boss 65 has a projecting portion 89 containing a spring pressed element 91 having a ball end which engages a notch 92 in an extension 93 on the cam element 84. This retains the cam element in a position to maintain the projections 75 out of engagement with the notches 68.

The hub 81 has rods 94 will ball ends 95 for manipulating the hub 81 to control the position of the clutch. A button 96 closes the aperture at the end of the hub. Upon the release of the clutch, as illustrated in FIG. 7, the hub 44 may be turned for rapidly retracting the slide 15, motor 16 and the drill carried thereby. Upon the reverse movement of the hub 81, the projections 75 will move into the next adjacent set of slots 68 to produce a drive between the worm wheel 64 and shaft extension 60 for driving the shaft 17 at a predetermined speed depending upon the ratio of the reduction gearing 55 and that produced through the planet systems 27, 29 and 31. The arrangement permits the application of substantial pressure to the drill end without resorting to a heavy motor 54 or the use of a pipe as a lever over a ball 43 and rod 42, as has been the common practice.

What is claimed is:

1. In drill device, a vertical movable slide carrying the drill, a rack on said slide, a shaft, a pinion on said shaft having teeth in mesh with the teeth of the rack, housing means for supporting one end of the shaft, a sun gear having a bearing for supporting the other end of said shaft, a driving hub keyed to the sun gear, a ring gear fixed to said housing means, planet gears between said sun and ring gears, and a carrier fixed to said shaft and rotatably supporting said planet gears for driving said shaft when said driving hub and sun gear are rotated.

2. In a drill device as recited in claim 1, wherein the opposite end of the shaft carries a hub by which the shaft is directly rotated for producing rapid movement of the slide.

3. In a drill device as recited in claim 2, wherein a housing extension is provided on said first housing into which a section of said shaft extends, a worm wheel in unit relation with a boss which are freely rotatable on said shaft section, motor and gear means for driving said worm wheel, and a clutch mechansm for securng the freely rotatable gear and boss in locked relation to the shaft section in one position.

4. In a drill device, a vertically movable slide carrying the drill, a rack on said slide, a shaft, a pinion on said shaft having teeth in mesh with the teeth of the rack, housing means for supporting one end of the shaft, a cam element having a bearing for supporting an end extension of said shaft, a worm wheel in unit relation with the boss which are freely rotatable on said shaft extension, motor and gear means for driving said worm wheel, and a clutch mechanism for securing the freely rotatable gear and boss in locked relation to the shaft extension in one position.

5. In a drill device as recited in claim 4, wherein means are supported on said housing means for moving said clutch mechanism to disengaged position.

6. In a drill device as recited in claim 5, wherein said clutch mechanism has a star wheel with notch means fixed to the shaft extension and said boss has locking lugs means with a projection which engages said notch means of the star wheel, and a cam element having surfaces for moving the locking lug means to retracted position when rotated a predetermined amount.

7. In a drill device as recited in claim 6, wherein a hub is journaled in said housing means and secured in fixed relation to said cam element for rotating the cam element and changing the position of said lug means.

8. In a drill device as recited in claim 7, wherein means are provided for locking said hub in clutch disengaged position.

9. In a drill device as recited in claim 8, wherein the motor of the gear means drives through a first gear set to drive a worm for driving said freely rotatable worm wheel and boss.

References Cited

UNITED STATES PATENTS 3,373,658   3/1968   Larsen _____ 77—34.6
2,955,491   10/1960  Buck _____ 77—33.4

FRANCIS S. HUSAR, Primary Examiner

U.S. Cl. X.R.

77—34.6

UNITED STATES PATENT OFFICE
CERTIFICATE OF CORRECTION

Patent No. 3,500,707 March 17, 1970

Wesley S. Warren

It is certified that error appears in the above identified patent and that said Letters Patent are hereby corrected as shown below:

Column 4, line 34, "the" should read -- a --.

Signed and sealed this 12th day of January 1971.

(SEAL)
Attest:

Edward M. Fletcher, Jr.  WILLIAM E. SCHUYLER, JR.
Attesting Officer  Commissioner of Patents